US010734916B2

(12) United States Patent
Shinomiya et al.

(10) Patent No.: US 10,734,916 B2
(45) Date of Patent: Aug. 4, 2020

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Yasuhiro Shinomiya, Chuo-ku (JP); Ryota Okuyama, Chuo-ku (JP); Taichiro Tsuchiya, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/499,909

(22) PCT Filed: Apr. 21, 2017

(86) PCT No.: PCT/JP2017/015972
§ 371 (c)(1),
(2) Date: Oct. 1, 2019

(87) PCT Pub. No.: WO2018/193606
PCT Pub. Date: Oct. 25, 2018

(65) Prior Publication Data
US 2020/0119659 A1 Apr. 16, 2020

(51) Int. Cl.
*H02M 1/32* (2007.01)
*H02M 1/36* (2007.01)
(Continued)

(52) U.S. Cl.
CPC ......... *H02M 7/49* (2013.01); *H02M 7/53871* (2013.01); *H02J 3/1857* (2013.01);
(Continued)

(58) Field of Classification Search
CPC .......... H02M 7/12; H02M 7/483; H02M 7/49; H02M 7/493; H02M 7/537; H02M 7/5375;
(Continued)

(56) References Cited

U.S. PATENT DOCUMENTS

2011/0019442 A1* 1/2011 Yamada .................. H02M 1/14
363/44
2011/0205768 A1* 8/2011 Svensson .............. H02J 3/1857
363/49
(Continued)

FOREIGN PATENT DOCUMENTS

EP 2549634 A1 * 1/2013 .............. H02M 7/49
WO WO-2010145688 A1 * 12/2010 .............. H02M 1/32
(Continued)

OTHER PUBLICATIONS

International Search Report dated Jun. 13, 2017 in PCT/JP2017/015972 filed on Apr. 21, 2017.

*Primary Examiner* — Gary L Laxton
*Assistant Examiner* — Ivan Laboy
(74) *Attorney, Agent, or Firm* — Oblon, McClelland, Maier & Neustadt, L.L.P.

(57) ABSTRACT

A power converter is electrically connected with an AC power supply via a switch, and is configured with a plurality of unit converters (5) connected in series. A drive circuit (40, 42) drives a plurality of switching elements (11 to 14) of a main circuit (30). An interface circuit (48) outputs a detection value of a voltage sensor (46) to a control device (4). If a bypass switch (7) is turned off when the power converter is activated, each of the plurality of unit converters (5) charges a capacitor (15) using power supplied from the AC power supply. When the power converter is activated, a power supply (50) supplies a power supply voltage to the voltage sensor (46) and the interface circuit (48), prior to the
(Continued)

drive circuit (40, 42). The control device (4) turns off the switch when the detection value of the voltage sensor (46) of at least one of the plurality of unit converters (5) is more than or equal to a predetermined value.

3 Claims, 8 Drawing Sheets

(51) Int. Cl.
*H02M 7/483* (2007.01)
*H02M 7/49* (2007.01)
*H02M 7/5387* (2007.01)
*H02J 3/18* (2006.01)
*H02M 1/00* (2006.01)

(52) U.S. Cl.
CPC .............. *H02M 1/32* (2013.01); *H02M 1/36* (2013.01); *H02M 7/483* (2013.01); *H02M 2001/0006* (2013.01); *H02M 2001/325* (2013.01); *H02M 2007/4835* (2013.01)

(58) Field of Classification Search
CPC ........... H02M 7/5387; H02M 7/53871; H02M 7/797; H02M 1/08; H02M 1/32; H02M 1/36; H02M 2007/4835; H02M 2001/003; H02M 2001/0006; H02M 2001/0067; H02M 2001/007; H02M 2001/322; H02M 2001/325; H02J 3/18; H02J 3/1857; H02J 7/0026; Y02E 40/16; Y02E 40/26; Y02E 40/30
See application file for complete search history.

(56) References Cited

U.S. PATENT DOCUMENTS

| | | | |
|---|---|---|---|
| 2011/0215890 A1* | 9/2011 | Abolhassani | H01F 7/06 336/60 |
| 2011/0222323 A1* | 9/2011 | Dofnas | H02M 7/483 363/71 |
| 2012/0063181 A1* | 3/2012 | Chimento | H02M 1/32 363/56.03 |
| 2012/0113698 A1* | 5/2012 | Inoue | H02M 1/08 363/123 |
| 2013/0208519 A1* | 8/2013 | Yamamoto | H02M 7/12 363/67 |
| 2013/0223115 A1* | 8/2013 | Tsuchiya | H02M 7/49 363/68 |
| 2014/0077767 A1* | 3/2014 | Hasler | H02J 3/1857 320/128 |
| 2014/0097804 A1* | 4/2014 | Hasler | H02J 3/18 320/166 |
| 2014/0103887 A1 | 4/2014 | Akagi et al. | |
| 2014/0146586 A1* | 5/2014 | Das | H02M 1/36 363/49 |
| 2015/0108091 A1* | 4/2015 | Oberg | H01H 39/004 218/65 |
| 2016/0036314 A1* | 2/2016 | Koyanagi | H02M 1/32 363/65 |
| 2018/0062498 A1* | 3/2018 | Fujii | H02M 7/483 |
| 2018/0191238 A1* | 7/2018 | Tsuchiya | H02M 1/08 |
| 2018/0351474 A1* | 12/2018 | Drofenik | H02M 1/32 |
| 2019/0157968 A1* | 5/2019 | Tsuchiya | H02M 7/12 |
| 2020/0076323 A1* | 3/2020 | Yonemura | H02J 3/1814 |

FOREIGN PATENT DOCUMENTS

| | | | |
|---|---|---|---|
| WO | WO-2011114816 A1 * | 9/2011 | ............. H02M 7/49 |
| WO | WO 2012/099176 A1 | 7/2012 | |
| WO | WO-2012159668 A1 * | 11/2012 | ............. H02H 9/001 |

* cited by examiner

POWER CONVERSION DEVICE

TECHNICAL FIELD

The present invention relates to a power conversion device, and more particularly to a power conversion device configured with a plurality of unit converters connected in series.

BACKGROUND ART

In recent years, it has been considered to apply a modular multilevel converter (MMC) to a self-excited reactive power compensation device such as a static synchronous compensator (STATCOM), a direct-current (DC) power transmission system such as a back to back (BTB) system, a motor drive inverter, and the like (for example, see WO2012/099176 (PTL 1)).

The MMC is configured with a plurality of unit converters connected in series. Each unit converter includes a main circuit that has switching elements and a DC capacitor. The unit converter causes the switching elements of the main circuit to perform switching operation to thereby output a voltage of the DC capacitor to output terminals. As a switching element, a semiconductor switching element that can be subjected to on/off control, such as an insulated gate bipolar transistor (IGBT), is generally used.

The main circuit further has a bypass switch connected between a pair of output terminals. The bypass switch is configured to be turned on when an abnormality such as a short circuit of a switching element occurs, to establish a short circuit between the pair of output terminals of a unit converter in which the abnormality occurs.

CITATION LIST

Patent Literature

PTL 1: WO2012/099176

SUMMARY OF INVENTION

Technical Problem

Each of the unit converters constituting the MMC is provided with, in addition to the main circuit, a control circuit for controlling turning on/off of the switching elements of the main circuit in cooperation with a high-order control device that controls the entire MMC. There is a known configuration called a main circuit power feeding system in which each of the unit converters in the MMC is provided with a power supply for supplying a power supply voltage to the control circuit based on power generated in the main circuit. When the MMC with such a configuration is activated, first, the DC capacitor of the main circuit is charged by power supplied from an alternating current (AC) power supply. Then, a voltage of the DC capacitor of the main circuit is stepped down by a current limiting resistor, thereby generating an input voltage to the power supply. Then, the power supply supplies a power supply voltage, which is obtained by further stepping down this input voltage, to the control circuit.

Generally, when the MMC is activated, initial charging for charging the DC capacitor of each of the plurality of unit converters connected in series is performed. In the initial charging, the DC capacitor of each unit converter is charged to a predetermined voltage. However, when the bypass switch of any of the unit converters is closed improperly, the DC capacitor of that unit converter is not charged. As a result, the DC capacitor of a proper unit converter connected to that unit converter in series may be overcharged. If the DC capacitor is overcharged, a voltage more than a rated voltage may be applied to components such as the overcharged DC capacitor, the power supply, the control circuit, and the like, and such components may be damaged.

The present invention has been made to solve the aforementioned problem. An object of the present invention is to suppress, in a power conversion device configured with a plurality of unit converters connected in series, damage to each unit converter due to overcharging, when the power conversion device is activated.

Solution to Problem

According to an aspect of the present invention, a power conversion device includes a power converter and a control device. The power converter is electrically connected with an AC power supply via a switch. The control device is configured to control the power converter. The power converter includes an arm configured with a plurality of unit converters connected in series. Each of the plurality of unit converters includes a main circuit, a control circuit, and a power supply. The main circuit includes a plurality of switching elements and a capacitor, and is configured to convert a voltage of the capacitor into AC power by controlling the plurality of switching elements. The control circuit is configured to control turning on/off of the plurality of switching elements according to a control signal received from the control device. The power supply is configured to step down the voltage of the capacitor to generate a power supply voltage that is to be supplied to the control circuit. The main circuit further includes a bypass switch connected between a pair of output terminals thereof. The bypass switch is configured to establish a short circuit between the pair of output terminals when the bypass switch is turned on. The control circuit further includes a drive circuit, a voltage sensor, and an interface circuit. The drive circuit is configured to drive the plurality of switching elements. The voltage sensor is configured to detect the voltage of the capacitor. The interface circuit is configured to output a detection value of the voltage sensor to the control device. The switch is configured to be turned on when the power converter is activated. Each of the plurality of unit converters is configured to charge the capacitor using power supplied from the AC power supply, if the bypass switch is turned off when the power converter is activated. The power supply is configured to supply the power supply voltage to the voltage sensor and the interface circuit, prior to the drive circuit, when the power converter is activated. The control device is configured to turn off the switch when the detection value of the voltage sensor of at least one of the plurality of unit converters is more than or equal to a predetermined value.

Advantageous Effects of Invention

According to the present invention, in a power conversion device configured with a plurality of unit converters connected in series, it is possible to suppress damage to each unit converter due to overcharging, when the power conversion device is activated.

DESCRIPTION OF EMBODIMENTS

Figure 1:
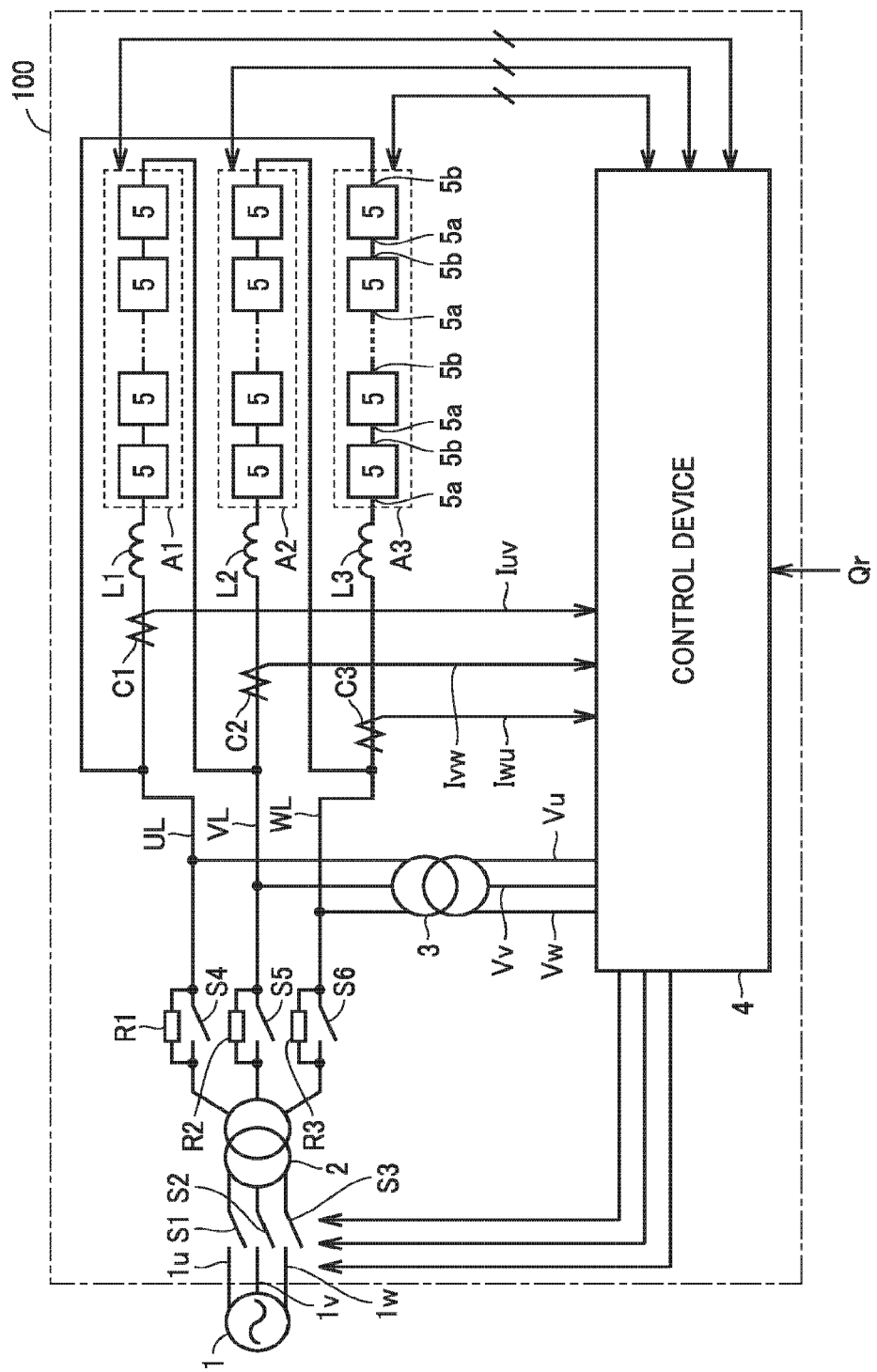
FIG. 1 is an overall configuration diagram of a power conversion device.

Hereinafter, an embodiment of the present invention will be described in detail with reference to the drawings. It should be noted that identical or corresponding parts in the drawings will be designated by the same reference characters, and the description thereof will not be repeated.

FIG. 1 is an overall configuration diagram of a power conversion device 100 in accordance with an embodiment of the present invention. In FIG. 1, power conversion device 100 is used as a reactive power compensation device for compensating for reactive power of a power system 1, and includes switches S1 to S6, transformers 2 and 3, current limiting resistors R1 to R3, AC lines UL, VL, and WL, current transformers C1 to C3, reactors L1 to L3, arms A1 to A3, and a control device 4.

Switches S1, S2, and S3 each have one terminal connected to a corresponding one of three-phase power transmission lines 1u, 1v, and 1w of power system 1 that supplies AC power, and the other terminal connected to a corresponding one of three primary windings of transformer 2. Switches S1 to S3 are usually turned on, and are turned off during maintenance of power conversion device 100, for example. Transformer 2 includes three primary windings and three secondary windings, and receives and transmits three-phase AC power.

Current limiting resistors R1, R2, and R3 each have one terminal connected to a corresponding one of the three secondary windings of transformer 2, and the other terminal connected to one end of a corresponding one of AC lines UL, VL, and WL. Current limiting resistors R1, R2, and R3 each limit a current flowing from power system 1 to a corresponding one of arms A1, A2, and A3 when power conversion device 100 is activated.

Switches S4, S5, and S6 are connected in parallel to current limiting resistors R1, R2, and R3, respectively, and are each turned on after the current flowing to the corresponding one of arms A1, A2, and A3 when power conversion device 100 is activated is stabilized. Transformer 3 feeds back three-phase AC voltages Vu, Vv, and Vw having values according to AC voltages of AC lines UL, VL, and WL, respectively, to control device 4.

Reactor L1 and arm A1 are connected in series between AC line UL and AC line VL. Reactor L2 and arm A2 are connected in series between AC line VL and AC line WL. Reactor L3 and arm A3 are connected in series between AC line WL and AC line UL. That is, arms A1 to A3 are delta-connected. Arms A1 to A3 are controlled by control device 4 to generate three-phase AC power.

Each of arms A1 to A3 includes a plurality of unit converters 5 connected in series. Each of the plurality of unit converters 5 generates AC power according to a control signal from control device 4.

A first terminal 5a of unit converter 5 in the first stage of arm A1 is connected to one terminal of reactor L1. In arm A1, a second terminal 5b of each of unit converters 5 other than unit converter 5 in the last stage is connected to first terminal 5a of a corresponding adjacent one of unit converters 5. Second terminal 5b of unit converter 5 in the last stage of arm A1 is connected to one terminal of reactor L2.

First terminal 5a of unit converter 5 in the first stage of arm A2 is connected to the other terminal of reactor L2. In arm A2, second terminal 5b of each of unit converters 5 other than unit converter 5 in the last stage is connected to first terminal 5a of a corresponding adjacent one of unit converters 5. Second terminal 5b of unit converter 5 in the last stage of arm A2 is connected to one terminal of reactor L3.

First terminal 5a of unit converter 5 in the first stage of arm A3 is connected to the other terminal of reactor L3. In arm A3, second terminal 5b of each of unit converters 5 other than unit converter 5 in the last stage is connected to first terminal 5a of a corresponding adjacent one of unit converters 5. Second terminal 5b of unit converter 5 in the last stage of arm A3 is connected to one terminal of reactor L1.

Reactors L1, L2, and L3 suppress a circulating current flowing to arms A1, A2, and A3, respectively. Reactors L1, L2, and L3 may be provided separately from arms A1, A2, and A3, respectively, or may be inductance components of arms A1, A2, and A3, respectively. Current transformers C1, C2, and C3 detect AC currents Iuv, Ivw, and Iwu flowing to arms A1, A2, and A3, respectively, and feed back the detected currents to control device 4.

Control device 4 receives inputs such as a reactive power command value Qr, three-phase AC voltages Vu, Vv, and Vw, AC currents Iuv, Ivw, and Iwu, and a voltage VDC (which will be described later), and outputs a control signal GC, a control signal GB, an ON command Son (each of which will be described later) and the like, thereby controlling each of three arms A1 to A3 (that is, each of 60 unit converters 5). Reactive power command value Qr is provided, for example, from a central command room (not shown) in power system 1. Power conversion device 100 supplies power system 1 with reactive power having a value according to reactive power command value Qr.

Figure 2:
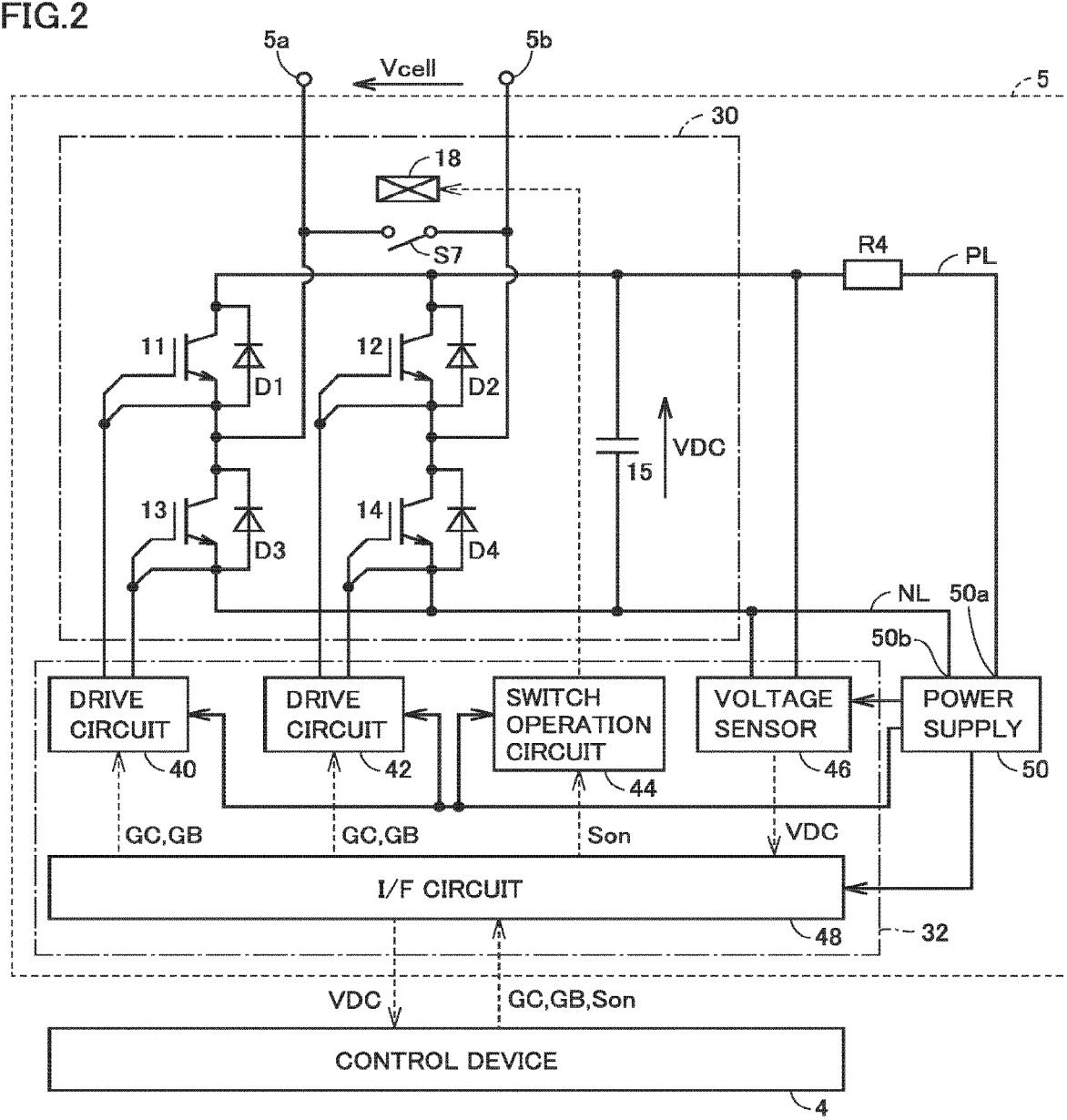
FIG. 2 is a configuration diagram of a unit converter shown in FIG. 1.

FIG. 2 is a configuration diagram of a unit converter shown in FIG. 1. Referring to FIG. 2, unit converter 5 includes a main circuit 30, a control circuit 32, a resistor R4, and a power supply 50.

Main circuit 30 is configured with a full bridge circuit including a capacitor. Specifically, main circuit 30 has a first terminal 5a and a second terminal 5b. Main circuit 30 includes switching elements 11 to 14, diodes D1 to D4, and a capacitor 15. Main circuit 30 turns on/off switching elements 11 to 14 to output a voltage pulse having an amplitude according to a voltage of capacitor 15, to between first terminal 5a and second terminal 5b, thereby converting DC power into AC power.

Switching elements 11 to 14 each are a self-arc-extinguishing power semiconductor element, and constituted of an IGBT, for example. Switching elements 11 and 13 are connected in series between a DC line PL and a DC line NL. Switching elements 12 and 14 are connected in series between DC line PL and DC line NL. Collectors of switching elements 11 and 12 are connected to DC line PL, and emitters of switching elements 13 and 14 are connected to DC line NL. A connection point between an emitter of switching element 11 and a collector of switching element 13 is connected to first terminal 5a. A connection point between an emitter of switching element 12 and a collector of switching element 14 is connected to second terminal 5b.

Diodes D1, D2, D3, and D4 are connected in anti-parallel with switching elements 11, 12, 13, and 14, respectively. Capacitor 15 is connected between DC line PL and DC line NL, and stores DC power.

In unit converter 5, conduction states (on/off states) of switching elements 11 to 14 are controlled by control circuit 32. Switching elements 11 and 13 are turned on/off in a manner complementary to each other. Switching elements 12 and 14 are turned on/off in a manner complementary to each other. As shown in FIG. 2, assuming that a voltage to first terminal 5a with respect to second terminal 5b is defined as a cell voltage Vcell, cell voltage Vcell is controlled by the on/off states of switching elements 11 to 14.

Specifically, when switching elements 11 and 14 are turned on and switching elements 12 and 13 are turned off, cell voltage Vcell is approximately equal to voltage VDC of capacitor 15. When switching elements 11 and 12 are turned on and switching elements 13 and 14 are turned off, cell voltage Vcell is approximately zero. When switching elements 11 and 12 are turned off and switching elements 13 and 14 are turned on, cell voltage Vcell is approximately zero. When switching elements 11 and 14 are turned off and switching elements 12 and 13 are turned on, cell voltage Vcell is approximately equal to a voltage obtained by inverting the polarity of voltage VDC of capacitor 15.

The entire voltage of each of arms A1 to A3 is represented by the sum of cell voltages Vcell of unit converters 5 included in each of arms A1 to A3. Accordingly, the entire voltage of each of arms A1 to A3 can be controlled by the on/off states of switching elements 11 to 14 constituting each of unit converters 5.

Main circuit 30 further includes a switch S7. Switch S7 is connected between first terminal 5a and second terminal 5b. Switch S7 is configured to be closed according to a command from control circuit 32 to thereby establish a short circuit between first terminal 5a and second terminal 5b. First terminal 5a and second terminal 5b correspond to "a pair of output terminals" in the present invention. Switch S7 corresponds to one embodiment of a "bypass switch" in the present invention.

Control circuit 32 includes drive circuits 40 and 42, a switch operation circuit 44, a voltage sensor 46, and an interface (I/F) circuit 48. Control circuit 32 is configured to control the conduction states of switching elements 11 to 14 according to the control signals received from control device 4.

I/F circuit 48 communicates with control device 4 via a wire (not shown) or wirelessly. From control device 4, I/F circuit 48 receives control signal GC for controlling the full bridge circuit in main circuit 30. From control device 4, I/F circuit 48 further receives control signal GB for setting all of switching elements 11 to 14 constituting the full bridge circuit to be nonconductive. I/F circuit 48 outputs the received control signal GC and control signal GB to drive circuits 40 and 42.

In response to control signal GC, drive circuit 40 controls turning on/off of switching elements 11 and 13. Alternatively, in response to control signal GB, drive circuit 40 sets switching elements 11 and 13 to a state where they are fixed to an OFF state (deactivated state).

In response to control signal GC, drive circuit 42 controls turning on/off of switching elements 12 and 14. Alternatively, in response to control signal GB, drive circuit 42 sets switching elements 12 and 14 to a state where they are fixed to an OFF state.

Switch operation circuit 44 is a circuit for operating switch S7 to be turned on (closed). Switch operation circuit 44 controls power conduction to an exciting coil 18 according to the command from control device 4. During normal operation, current supply to exciting coil 18 is stopped, so that switch S7 is set to an OFF (opened) state. On the other hand, when control device 4 detects an abnormality such as a short-circuit fault of a switching element in any one of the plurality of unit converters 5, control device 4 outputs ON command Son for switch S7 to this faulty unit converter 5. In faulty unit converter 5, I/F circuit 48 receives ON command Son and outputs it to switch operation circuit 44. In response to ON command Son, switch operation circuit 44 supplies a current to exciting coil 18, thereby turning on switch S7. Thus, an output of faulty unit converter 5 is short-circuited.

Voltage sensor 46 detects voltage VDC between terminals of capacitor 15, and outputs a detection value to I/F circuit 48. I/F circuit 48 transmits the detection value of voltage VDC to control device 4.

Resistor R4 is a current limiting resistor configured to step down voltage VDC of capacitor 15 and adjust a voltage that is to be input to power supply 50 to be equal to a voltage Vin.

Power supply 50 is electrically connected in parallel to capacitor 15. Power supply 50 includes input terminals 50a and 50b. Input terminal 50a is connected to DC line PL. Input terminal 50b is connected to DC line NL. Power supply 50 further steps down voltage Vin and generates a power supply voltage that is to be supplied to control circuit 32. That is, each unit converter 5 forms a self-contained cell in which power can be supplied from main circuit 30 to control circuit 32.

Figure 3:
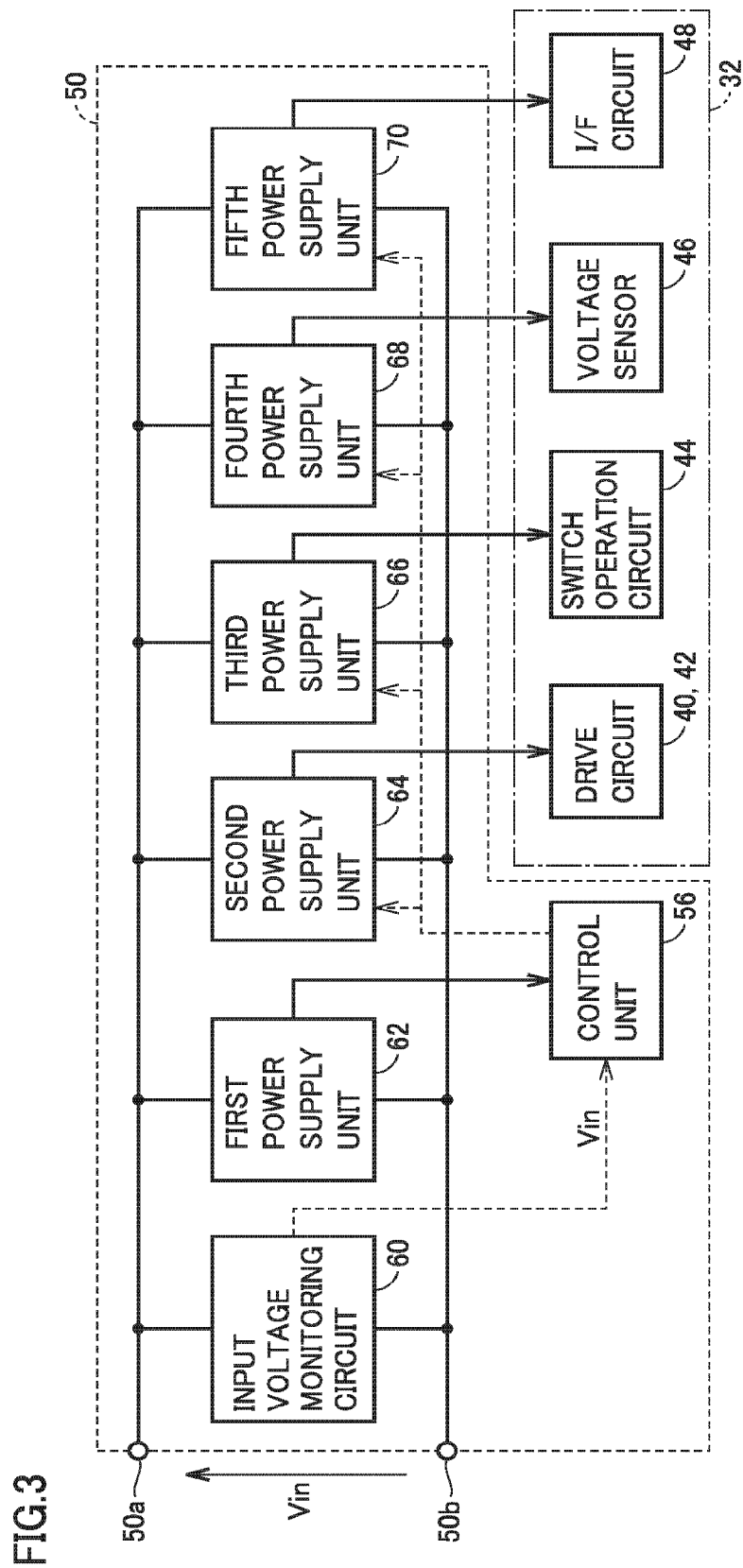
FIG. 3 is a configuration diagram of a power supply shown in FIG. 2.

FIG. 3 is a configuration diagram of power supply 50 shown in FIG. 2. Referring to FIG. 3, power supply 50 includes an input voltage monitoring circuit 60, a control unit 56, and a plurality of power supply units 62 to 70.

Input voltage monitoring circuit 60 detects voltage Vin supplied from input terminals 50a and 50b, and outputs a detection value to control unit 56.

Control unit 56 outputs a command for activation or deactivation to the plurality of power supply units 64 to 70 based on the detection value of voltage Vin.

The plurality of power supply units 62 to 70 each are a step-down circuit that steps down voltage Vin and generates a power supply voltage that is to be supplied to a corresponding unit of control circuit 32. Specifically, first power supply unit 62 converts voltage Vin into a power supply voltage for control unit 56. Second power supply unit 64 converts voltage Vin into a power supply voltage for drive circuits 40 and 42. Third power supply unit 66 converts voltage Vin into a power supply voltage for switch operation circuit 44. Fourth power supply unit 68 converts voltage Vin into a power supply voltage for voltage sensor 46. Fifth power supply unit 70 converts voltage Vin into a power supply voltage for I/F circuit 48.

In the present embodiment, the power supply voltages for voltage sensor 46 and I/F circuit 48 are lower than the power supply voltages for drive circuits 40 and 42 and switch operation circuit 44. For example, the power supply voltages for first power supply unit 62 to fifth power supply unit 70 are 5 V, 24 V, 100 V, 15 V, and 5 V, respectively.

Figure 4:
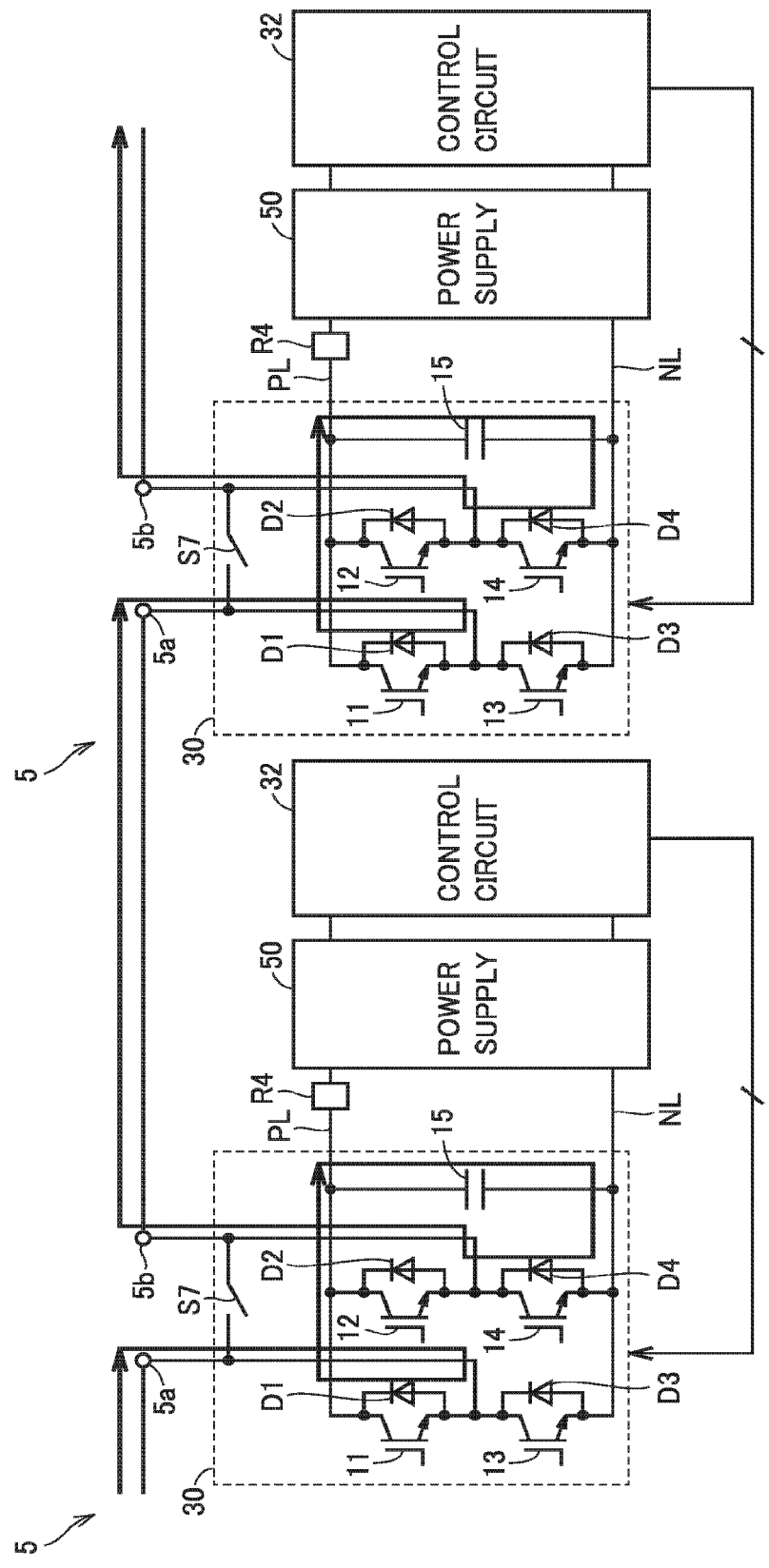
FIG. 4 is a diagram showing a manner of initial charging in a normal power conversion device.

When power conversion device 100 is activated, first, capacitor 15 is initially charged by the power supplied from power system 1. FIG. 4 is a diagram showing a manner of initial charging in normal power conversion device 100.

Referring to FIG. 4, when normal power conversion device 100 is activated, since switch S7 is opened and switching elements 11 to 14 are in the OFF state, a path in which a current flows through first terminal 5a, diode D1, capacitor 15, diode D4, and second terminal 5b is formed, as indicated by arrows in the drawing. Through this current path, a charge is stored in capacitor 15, and thereby voltage VDC of capacitor 15 increases. Then, the current flows into adjacent unit converter 5 from first terminal 5a thereof, thereby charging a capacitor thereof in the same manner. In this manner, capacitors 15 of all unit converters 5 on arms A1 to A3 are charged.

Since unit converters 5 in each of arms A1 to A3 are connected in series, voltage VDC of capacitor 15 of each unit converter 5 increases to a value obtained by dividing a voltage applied to each of arms A1 to A3 (i.e., each of interphase voltages Vuv, Vvw, and Vwu) by the number of unit converters 5 included in each of arms A1 to A3.

When the initial charging of capacitor 15 is finished as described above, power conversion device 100 starts normal operation. In the following, a summary of the normal operation of power conversion device 100 will be described.

Based on AC currents Iuv, Ivw, and Iwu from current transformers C1, C2, and C3, respectively, control device 4 calculates three-phase AC currents Iu, Iv, and Iw having levels according to AC currents flowing through AC lines UL, VL, and WL, respectively. It should be noted that Iu=Iuv−Iwu, Iv=Ivw−Iuv, and Iw=Iwu−Ivw.

Control device 4 calculates reactive power Q based on three-phase AC voltages Vu, Vv, and Vw from transformer 3 and three-phase AC currents Iu, Iv, and Iw from a computing unit 31. Control device 4 calculates a deviation ΔQ between reactive power command value Qr and reactive power Q (ΔQ=Qr−Q).

Based on AC currents Iuv, Ivw, and Iwu from current transformers C1, C2, and C3, respectively, three-phase AC voltages Vu, Vv, and Vw from transformer 3, and the like, control device 4 generates 60 voltage command values VDCr respectively corresponding to the plurality of unit converters 5.

Control device 4 calculates a deviation ΔVDC between each voltage command value VDCr and voltage VDC. Control device 4 generates three-phase AC voltage command values Vuvr2, Vvwr2, and Vwur2 such that an integrated value of voltage deviation ΔVDC is set to 0 and an integrated value of reactive power deviation ΔQ is set to 0.

In other words, control device 4 performs active current control for each unit converter 5 such that the integrated value of voltage deviation ΔVDC is set to 0, and also performs reactive current control for each unit converter 5 such that the integrated value of reactive power deviation ΔQ is set to 0. Three-phase AC voltage command values Vuvr2, Vvwr2, and Vwur2 serve as three-phase AC voltage command values Vuvr, Vvwr, and Vwur.

Based on three-phase AC voltage command values Vuvr, Vvwr, and Vwur, each of unit converters 5 in each of arms A1 to A3 is operated, and voltage VDC is set to voltage command value VDCr and reactive power Q is set to reactive power command value Qr. Specifically, for example, according to pulse width modulation (PWM) control, control device 4 generates control signals GC and GB for causing power conversion device 100 to output voltages corresponding to three-phase AC voltage command values Vuvr, Vvwr, and Vwur. Control device 4 outputs control signals GC and GB to control circuit 32 of each of unit converters 5 in each of arms A1 to A3. According to control signals GC and GB, each control circuit 32 turns on switching elements 11 to 14 at predetermined timing, thereby converting a DC voltage into an AC voltage.

In the manner as described above, power conversion device 100 performs the normal operation for compensating for reactive power, after the initial charging of capacitor 15.

If switch S7 of any one of unit converters 5 is closed improperly when power conversion device 100 with such a configuration is activated, capacitor 15 of that unit converter 5 is not charged, which may lead to overcharging in which capacitors 15 of proper unit converters 5 connected in series with that unit converter 5 are overcharged.

Figure 5:
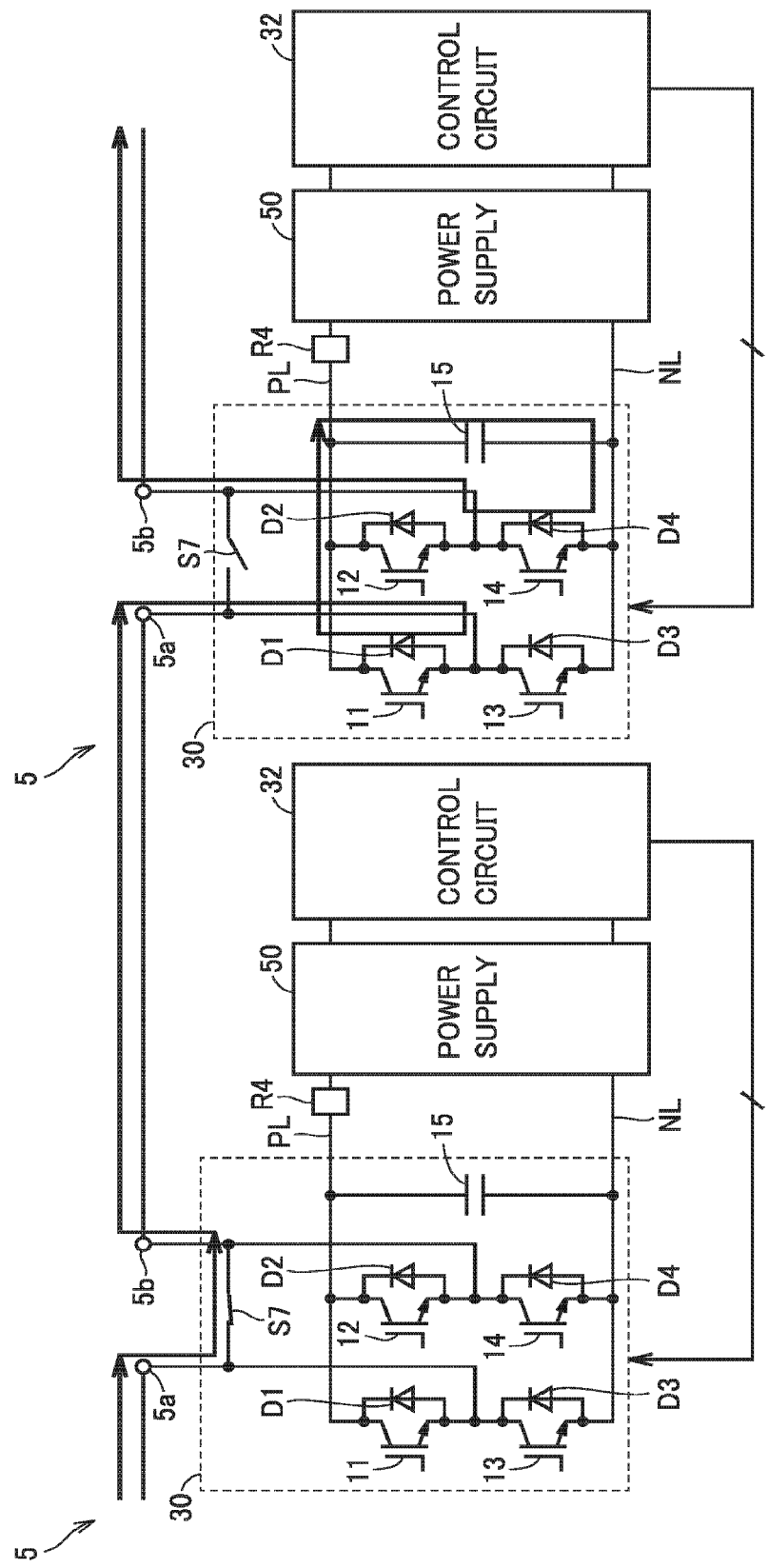
FIG. 5 is a diagram showing a manner of initial charging in a power conversion device that includes a unit converter having a bypass switch closed improperly.

FIG. 5 is a diagram showing a manner of initial charging in power conversion device 100 that includes unit converter 5 having switch S7 closed improperly. Unit converter 5 shown on the left side of FIG. 5 is an abnormal unit converter that is in a state where switch S7 is closed improperly and first terminal 5a and second terminal 5b are electrically short-circuited. In such an abnormal unit converter 5, no current flows to capacitor 15 as indicated by arrows in the drawing, and thus no charge is stored in capacitor 15.

In such a case, voltage VDC of capacitors 15 of proper unit converters 5 as shown on the right side of FIG. 5 increases to a value obtained by dividing the voltage applied to each of arms A1 to A3 (i.e., each of interphase voltages Vuv, Vvw, and Vwu) by the number of proper unit converters 5 included in each of arms A1 to A3. That is, voltage VDC in proper unit converters 5 increases as the number of abnormal unit converters 5 increases. As a result, capacitors 15 of proper unit converters 5 may be overcharged.

For example, when half of unit converters 5 in any one of arms A1 to A3 are abnormal, voltage VDC of capacitors 15 of the proper unit converters in the corresponding one of arms A1 to A3 nearly doubles when compared with that in a normal state. In this case, such capacitors 15 may be damaged. Further, in each of the overcharged unit converters, an overvoltage exceeding a breakdown voltage may be applied to power supply 50 and control circuit 32, and these circuit components may be damaged.

In order to suppress such damage to the circuit components due to overcharging of capacitors 15 during the initial charging, a configuration is conceivable in which voltage VDC of each capacitor 15 is monitored, and, if voltage VDC becomes more than or equal to a predetermined threshold value, power conversion device 100 is disconnected from power system 1 to forcibly deactivate the initial charging.

Figure 6:
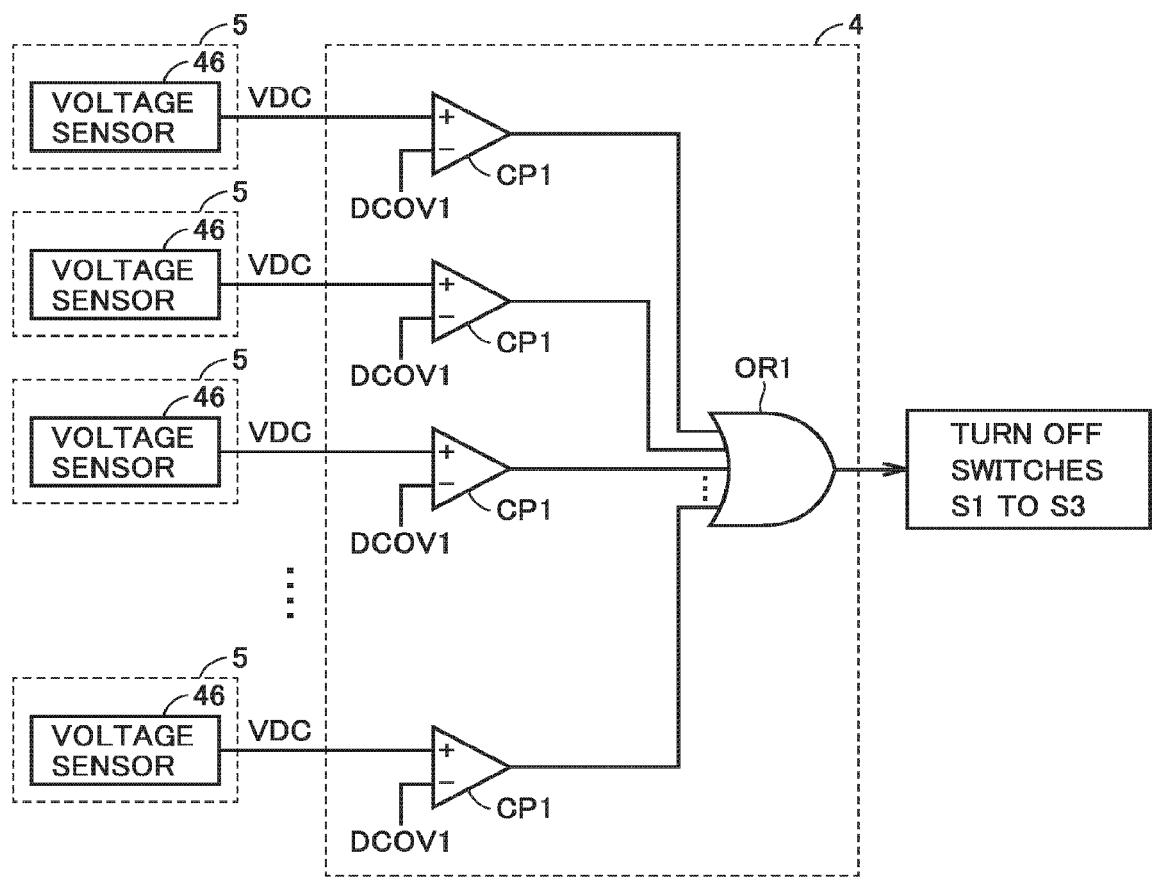
FIG. 6 is a diagram for illustrating deactivation control for the power conversion device based on a voltage of each capacitor.

FIG. 6 is a diagram for illustrating deactivation control for power conversion device 100 based on the voltage of each capacitor. Referring to FIG. 6, control device 4 includes a plurality of comparators CP1 and an OR circuit OR1. The plurality of comparators CP1 are respectively associated with voltage sensors 46 of the plurality of unit converters 5 included in power conversion device 100.

A non-inverted input terminal (positive terminal) of each comparator CP1 receives the detection value of voltage VDC detected by voltage sensor 46 of corresponding unit converter 5. An inverted input terminal (negative terminal) of each comparator CP1 receives a threshold voltage DCOV1. Threshold voltage DCOV1 is set to a value that is higher than a rated voltage of capacitor 15 and is lower than an allowable voltage of capacitor 15. Comparator CP1 compares the detection value of voltage VDC with threshold voltage DCOV1, and outputs the result of comparison. When the detection value of voltage VDC is more than threshold voltage DCOV1, an output signal of comparator CP1 is set to an H (logic high) level. On the other hand, when the detection value of voltage VDC is less than or equal to threshold voltage DCOV1, the output signal of comparator CP1 is set to an L (logic low) level.

OR circuit OR1 receives the output signals of the plurality of comparators CP1, and outputs a logical sum of these output signals. Based on the logical sum, control device 4 controls switches S1 to S3 connected between power system 1 and transformer 2. When the output signal of at least one comparator CP1 is at the H level, that is, when the detection value of voltage VDC is more than threshold voltage DCOV1 in at least one unit converter 5, switches S1 to S3 are turned off, and the initial charging of power conversion device 100 is deactivated. On the other hand, when all of the output signals of the plurality of comparators CP1 are at the L level, that is, when the detection value of voltage VDC is less than or equal to threshold voltage DCOV1 in all of unit converters 5, power conversion device 100 continues the initial charging with switches S1 to S3 being turned on.

Figure 7:
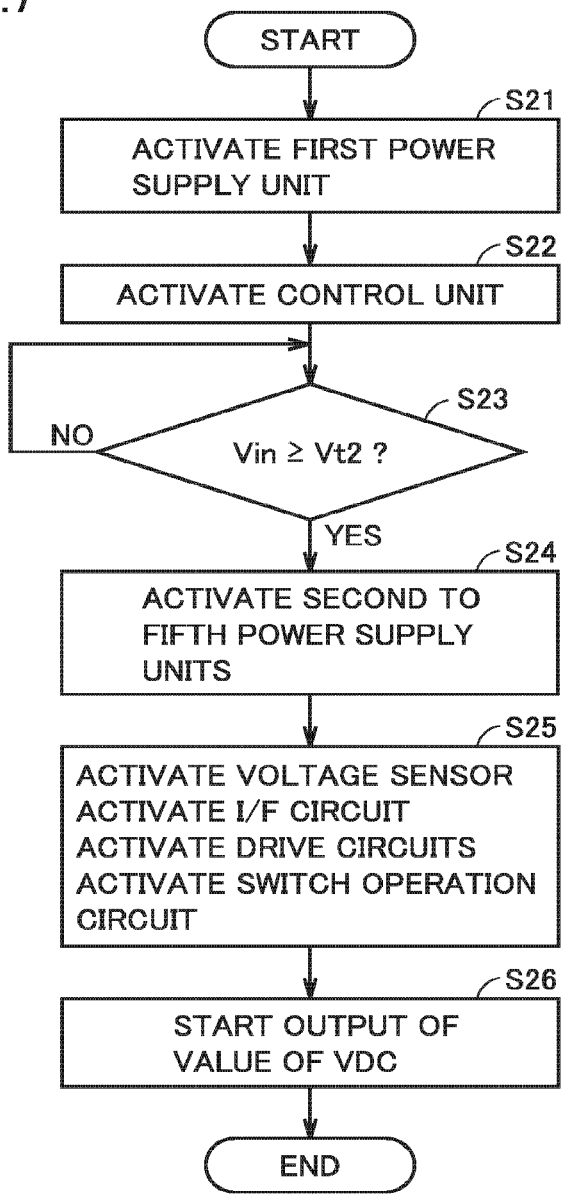
FIG. 7 is a flowchart showing control processing for activation of the power supply during initial charging in accordance with a comparative example.

In order to allow control device 4 to perform such deactivation control for the initial charging based on voltage VDC of each capacitor 15, it is necessary to activate voltage sensor 46 for detecting voltage VDC of capacitor 15, and activate I/F circuit 48 for outputting the detection value of voltage VDC to control device 4. Activation/deactivation of each unit of control circuit 32 including voltage sensor 46 and I/F circuit 48 is controlled by activation/deactivation of a corresponding power supply unit of power supply 50. FIG. 7 is a flowchart showing control processing for activation of the power supply during initial charging in accordance with a comparative example. The control processing shown in FIG. 7 is mainly performed by control unit 56 of power supply 50.

Referring to FIG. 7, in step S21, when power conversion device 100 is activated, switches S1 to S3 are turned on by control device 4, and thereby, charging of capacitor 15 of each unit converter 5 is started. Voltage VDC of capacitor 15 is stepped down, and voltage Vin is input to power supply 50. When voltage Vin exceeds a predetermined voltage, first power supply unit 62 of power supply 50 is activated.

In step S22, first power supply unit 62 supplies the power supply voltage to control unit 56, and activates it.

Then, when the detection value of voltage Vin detected by input voltage monitoring circuit 60 is more than or equal to a predetermined voltage Vt2 in step S23 (YES in step S23), in step S24, control unit 56 activates second to fifth power supply units 64, 66, 68, and 70. When the detection value of voltage Vin is less than voltage Vt2 in step S23, the processing remains at step S23. Voltage Vt2 is a determination value for determining that voltage Vin has reached a voltage required to activate all of power supply units 62, 64, 66, 68, and 70.

In step S25, power supply units 64, 66, 68, and 70 of power supply 50 supply the power supply voltages to drive circuits 40 and 42, switch operation circuit 44, voltage sensor 46, and I/F circuit 48, respectively, to activate them.

In step S26, voltage sensor 46 starts detection of voltage VDC after it is activated. Voltage sensor 46 outputs the detection value of voltage VDC to I/F circuit 48. I/F circuit 48 starts output of the detection value to control device 4 after it is activated. Then, control device 4 starts the deactivation control based on the detection value of voltage VDC shown in FIG. 6. That is, when the detection value of voltage VDC is more than threshold voltage DCOV1 in at least one unit converter 5, the output signal of at least one comparator CP1 is set to the H level. On this occasion, switches S1 to S3 are turned off, and the initial charging of power conversion device 100 is deactivated.

Thus, in the comparative example, the four power supply units that supply the power supply voltages to drive circuits 40 and 42, switch operation circuit 44, voltage sensor 46, and I/F circuit 48, respectively, are all activated simultaneously. Accordingly, the output of the detection value of voltage VDC to control device 4 is started after drive circuits 40 and 42, switch operation circuit 44, voltage sensor 46, and I/F circuit 48 are all activated. Then, in control device 4, the detection value of voltage VDC is compared with threshold voltage DCOV1, and it is determined whether capacitor 15 is not overcharged. Since determination on overcharging is started after waiting for activation of all of the units of control circuit 32 as described above, it takes time to detect the overcharging caused for example by the bypass switch in an improper state, which may increase damage.

In the embodiment of the present invention, the power supply units that supply the power supply voltages to voltage sensor 46 and I/F circuit 48, which are units required to output the detection value of voltage VDC to control device 4, are activated in preference to other power supply units. That is, overcharging of capacitor 15 can be detected in a short time by outputting the detection value of voltage VDC to control device 4 faster when compared with the comparative example, without applying an additional component. This can faster prevent the spread of an abnormality, and thus can minimize damage.

Figure 8:
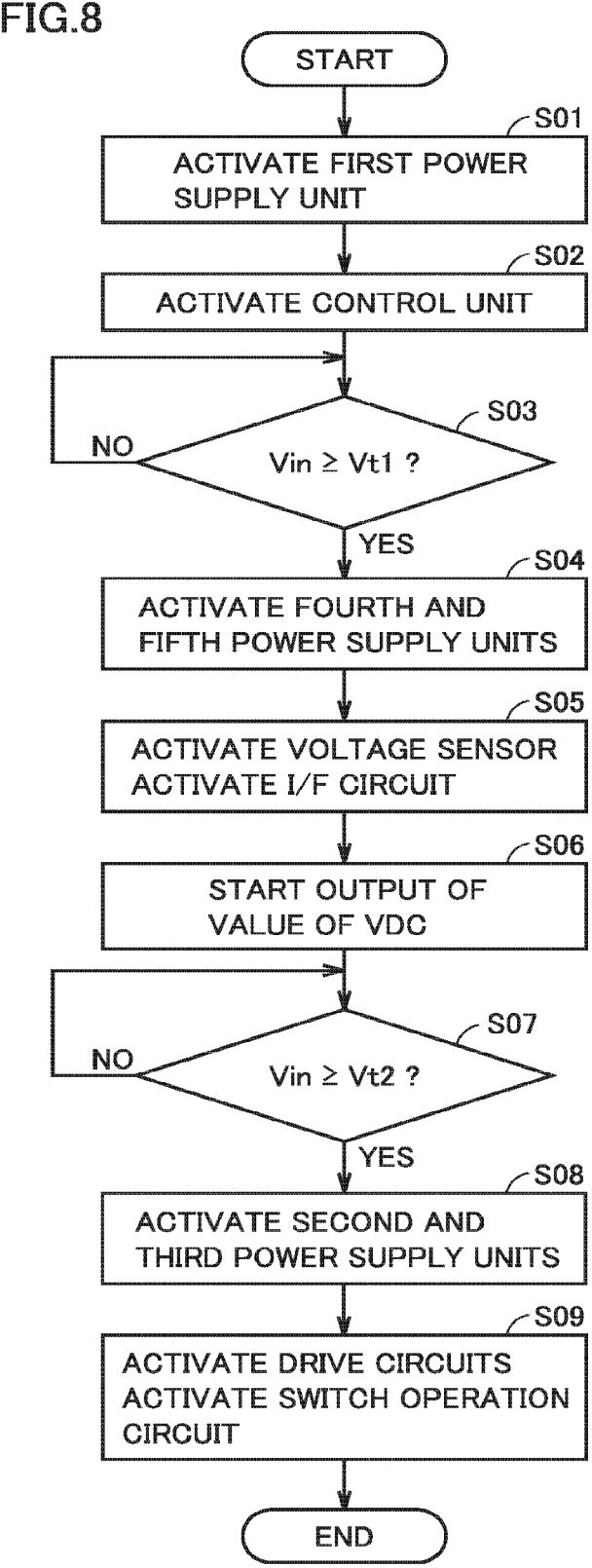
FIG. 8 is a flowchart showing control processing for activation of the power supply during initial charging in accordance with an embodiment of the present invention.

FIG. 8 is a flowchart showing control processing for activation of the power supply during initial charging in accordance with the embodiment of the present invention. The control processing shown in FIG. 8 is mainly performed by control unit 56 of power supply 50, as in FIG. 7. When FIG. 8 is compared with FIG. 7, power conversion device 100 in accordance with the embodiment of the present invention is different from power conversion device 100 in accordance with the comparative example in the processing in steps S03 to S08. In the following, steps S03 to S08 will be mainly described.

Referring to FIG. 8, the processing in steps S01 to S02 is the same as the processing in steps S21 to S22 in FIG. 7.

Then, when the detection value of voltage Vin detected by input voltage monitoring circuit 60 is more than or equal to a predetermined voltage Vt1 in step S03 (YES in step S03), in step S04, control unit 56 activates fourth power supply unit 68 and fifth power supply unit 70 of power supply 50. When the detection value of voltage Vin is less than voltage Vt1 in step S03, the processing remains at step S03 Voltage Vt1 is a determination value for determining that voltage Vin has reached a voltage required to activate first power supply unit 62, fourth power supply unit 68, and fifth power supply unit 70.

In step S05, fourth power supply unit 68 and fifth power supply unit 70 supply the power supply voltages to voltage sensor 46 and I/F circuit 48, respectively, to activate them.

In step S06, voltage sensor 46 starts detection of voltage VDC, and outputs the detection value of voltage VDC to I/F circuit 48. I/F circuit 48 starts output of the detection value to control device 4. Then, control device 4 starts the deactivation control based on the detection value of voltage VDC input from the IN circuit 48 of each unit converter 5, which is shown in FIG. 6. That is, when the detection value of voltage VDC is more than threshold voltage DCOV1 in at least one unit converter 5, the output signal of at least one comparator CP1 is set to the H level. On this occasion, switches S1 to S3 are turned off, and the initial charging of power conversion device 100 is deactivated.

When the detection value of voltage Vin is more than or equal to predetermined voltage Vt2 in step S07 (YES in step S07), in step S08, second power supply unit 64 and third power supply unit 66 are activated. When the detection value of voltage Vin is less than voltage Vt2 in step S07, the processing remains at step S07.

In step S09, second power supply unit 64 and third power supply unit 66 supply the power supply voltages to drive circuits 40 and 42 and switch operation circuit 44, respectively, to activate them.

With such a configuration, whether capacitor 15 is not overcharged can be determined at a stage when voltage Vin reaches lower voltage Vt1, without waiting for voltage Vin to reach voltage Vt2, during the initial charging of power conversion device 100.

That is, according to power conversion device 100 in accordance with the embodiment of the present invention, overcharging of a capacitor can be immediately detected by activating the units required to monitor the voltage of the capacitor (the voltage sensor and the I/F circuit), at a stage when power that can activate the required circuits is stored, without waiting for power that can activate all of the units in the control circuit to be stored in the capacitor. Accordingly, in power conversion device 100 configured with the plurality of unit converters connected in series, it is possible to suppress damage to each unit converter due to overcharging, when power conversion device 100 is activated.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: power system; 1$u$, 1$v$, 1$w$: power transmission line; 2, 3: transformer; 4: control device; 5: unit converter; 5$a$: first terminal; 5$b$: second terminal; 11 to 14: switching elements; 15: capacitor; 18: exiting coil; 30: main circuit; 32: control circuit; 40, 42: drive circuit; 44: switch operation circuit; 46: voltage sensor; 48: I/F circuit; 50: power supply; 50$a$, 50$b$: input terminal; 56: control unit; 60: input voltage monitoring circuit; 62, 64, 66, 68, 70: first to fifth power supply units; A, A1 to A3: arms; C1 to C3: current transformers; CP1: comparator; D1 to D4: diodes; L1 to L3: reactors; NL, PL: DC line; OR1: OR circuit; R1 to R3: current limiting resistors; R4: resistor; S1 to S7: switch; UL, VL, WL: AC line.

The invention claimed is:

1. A power conversion device comprising:
   a power converter electrically connected with an AC power supply via an AC-side switch; and
   a control device configured to control the power converter,
   the power converter including an arm configured with a plurality of unit converters connected in series,
   each of the plurality of unit converters including
      a main circuit including a plurality of switching elements and a capacitor, the main circuit being configured to convert a voltage of the capacitor into an AC voltage by controlling the plurality of switching elements,
      a control circuit configured to control the plurality of switching elements according to a control signal received from the control device, and
      a power supply configured to step down the voltage of the capacitor to generate a power supply voltage that is to be supplied to the control circuit,
   the main circuit further including a bypass switch connected between a pair of output terminals thereof,
   the bypass switch being configured to establish a short circuit between the pair of output terminals when the bypass switch is turned on,
   the control circuit including
      a drive circuit configured to drive the plurality of switching elements,
      a voltage sensor configured to detect the voltage of the capacitor, and
      an interface circuit configured to output a detection value of the voltage sensor to the control device,
   the AC-side switch being configured to be turned on when the power converter is activated,
   each of the plurality of unit converters being configured to charge the capacitor using power supplied from the AC power supply, if the bypass switch is turned off when the power converter is activated,
   the power supply being configured to supply the power supply voltage to the voltage sensor and the interface circuit, prior to the drive circuit, when the power converter is activated,
   the control device being configured to turn off the AC-side switch when the detection value of the voltage sensor of at least one of the plurality of unit converters is more than or equal to a predetermined value.

2. The power conversion device according to claim 1, wherein the power supply is configured to supply the power supply voltage to the voltage sensor and the interface circuit, when a voltage that is based on power supplied from the capacitor reaches a voltage required to activate the voltage sensor and the interface circuit, without waiting for the voltage to reach a voltage required to also activate the drive circuit.

3. The power conversion device according to claim 2, wherein the power supply is configured to generate a plurality of power supply voltages, a first power supply voltage to be supplied to the voltage sensor and a second power supply voltage to be supplied to the interface circuit are lower than a third power supply voltage to be supplied to the drive circuit, and the power supply is configured to generate the first and second power supply voltages, when the voltage that is based on the power supplied from the capacitor reaches a voltage required to allow the power supply to generate the first and second power supply voltages, without waiting for the voltage to reach a voltage required to allow the power supply to generate the third power supply voltage.

* * * * *